(12) United States Patent
Trika et al.

(10) Patent No.: US 8,171,219 B2
(45) Date of Patent: May 1, 2012

(54) METHOD AND SYSTEM TO PERFORM CACHING BASED ON FILE-LEVEL HEURISTICS

(75) Inventors: Sanjeev N. Trika, Hillsboro, OR (US); Amber D. Huffman, Banks, OR (US); James A. Boyd, Hillsboro, OR (US); Frank T. Hady, Portland, OR (US); Glenn J. Hinton, Portland, OR (US); Dale J. Juenemann, North Plains, OR (US); Oscar P. Pinto, Portland, OR (US); Scott R. Tetrick, Portland, OR (US); Thomas J. Barnes, Beaverton, OR (US); Scott E. Burridge, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 466 days.

(21) Appl. No.: 12/415,595

(22) Filed: Mar. 31, 2009

(65) Prior Publication Data

US 2010/0250834 A1    Sep. 30, 2010

(51) Int. Cl.
 *G06F 12/00* (2006.01)
(52) U.S. Cl. .......... 711/118; 711/E12.001; 711/112
(58) Field of Classification Search .......... 711/103, 711/118, E12.001
 See application file for complete search history.

(56) References Cited

U.S. PATENT DOCUMENTS

| | | | |
|---|---|---|---|
| 5,257,370 A | 10/1993 | Letwin | |
| 7,237,061 B1 | 6/2007 | Boic | |
| 7,509,329 B1 | 3/2009 | Leverett et al. | |
| 2002/0124135 A1 | 9/2002 | Newman | |
| 2003/0005457 A1 | 1/2003 | Faibish et al. | |
| 2003/0061352 A1* | 3/2003 | Bohrer et al. | 709/226 |
| 2007/0168603 A1 | 7/2007 | Takai et al. | |
| 2008/0046660 A1 | 2/2008 | Takai et al. | |

(Continued)

FOREIGN PATENT DOCUMENTS

EP    0702305    3/1996

(Continued)

OTHER PUBLICATIONS

Li-Pin Chang 'Hybrid solid-state disks: Combining Heterogeneous NAND Flash in Large SSDs', Design Automation Conference 2008, ASPDAC 2008, Asia and South Pacific, Mar. 21-24, 2008, pp. 428-433.*

Office Action for German Patent Application No. 10 2010 013 389.2-53 Mailed Oct. 22, 2010, 8 pages.

(Continued)

*Primary Examiner* — Pierre-Michel Bataille
(74) *Attorney, Agent, or Firm* — Blakely, Sokoloff, Taylor & Zafman LLP

(57) ABSTRACT

A method and system to perform caching based at least on one or more file-level heuristics. The caching of a storage medium in a caching device is performed by a cache policy engine. The cache policy engine receives file-level information of input/output access of data of the storage medium and caches or evicts the data of the storage medium in the caching device based on the received file-level information. By utilizing information about the files and file operations associated with the disk sectors or logical block addresses of the storage medium, the cache policy engine can make a better decision on the data selection of the storage medium to be cached in or evicted from the caching device in one embodiment of the invention. Higher cache hit rates can be achieved and the performance of the system utilizing the cache policy engine is improved.

36 Claims, 3 Drawing Sheets

U.S. PATENT DOCUMENTS

| | | | |
|---|---|---|---|
| 2008/0126680 A1* | 5/2008 | Lee et al. | 711/103 |
| 2008/0162795 A1* | 7/2008 | Hsieh et al. | 711/103 |
| 2008/0177938 A1 | 7/2008 | Yu | |
| 2008/0215800 A1* | 9/2008 | Lee et al. | 711/103 |
| 2008/0244164 A1* | 10/2008 | Chang et al. | 711/103 |
| 2009/0204746 A1* | 8/2009 | Chen et al. | 711/103 |
| 2009/0327591 A1* | 12/2009 | Moshayedi | 711/103 |
| 2010/0122016 A1* | 5/2010 | Marotta et al. | 711/103 |
| 2010/0153616 A1* | 6/2010 | Garratt | 711/6 |

FOREIGN PATENT DOCUMENTS

| | | |
|---|---|---|
| KR | 102007005432 | 5/2007 |

OTHER PUBLICATIONS

Combined Search and Examination Report for United Kingdom Patent Application No. GB1005305.6 Jul. 12, 2010, 9 pages.

U.S. Appl. No. 12/286,340, Juenemann, Dale et al.

Intel NAND Flash Memory for Intel Turbo Memory, 2007, 8 pages, Intel Corporation.

Windows PC Accelerators, Nov. 30, 2006, 16 pages, Microsoft Corporation.

Second Examination Report for United Kingdom Patent Application No. 1005305.6, Mailed Apr. 28, 2011, 3 pages.

* cited by examiner

| 510 LBA | 520 FILENAME | 530 SIZE | 540 TYPE | 550 OPERATION |
|---|---|---|---|---|
| 0x2800 | example.ppt | 0x200 | Office document | Reading |
| 0x2801 | example.ppt | 0x200 | Office document | Reading |
| 0x2802 | example.ppt | 0x200 | Office document | Reading |
| 0x3500 | music.mp3 | 0x200 | Media-streaming | Playing |
| 0x3501 | music.mp3 | 0x200 | Media-streaming | Playing |
| 0x4010 | Tutorial.pdf | 0x200 | Acrobat | Deleting |
| 0x4011 | Tutorial.pdf | 0x200 | Acrobat | Deleting |

500                       FIG. 5

METHOD AND SYSTEM TO PERFORM CACHING BASED ON FILE-LEVEL HEURISTICS

FIELD OF THE INVENTION

This invention relates to the field of caching, and more specifically but not exclusively, to perform caching based on file-level heuristics.

BACKGROUND DESCRIPTION

The performance of hard-disk drives has lagged significantly behind the performance of central processing units. As such, the input/output (I/O) data transfer to hard-disk drives remains one of the biggest bottlenecks of computer systems. Even though the advent of faster drives such as solid state drives is alleviating the bottleneck, the relatively high cost of the faster drives is prohibiting mass adoption of the faster drives as the dominant storage device.

To alleviate the bottleneck problem, non-volatile memory has been used as a cache for the hard-disk drive in a system. For example, some disk sectors or logical block addresses (LBAs) of the hard-disk drive can be cached in a non-volatile memory, so that the central processing unit is able to access the data cached in the non-volatile memory at a faster access rate than the hard-disk drive.

The caching schemes used to accelerate I/O data transfer are based primarily on LBA-level access patterns or specific instructions from an operating system or a user to pin or unpin LBAs in the non-volatile memory.

BRIEF DESCRIPTION OF THE DRAWINGS

The features and advantages of embodiments of the invention will become apparent from the following detailed description of the subject matter in which:

FIG. 5 illustrates a table that maps the LBAs to file-level information in accordance with one embodiment of the invention.

DETAILED DESCRIPTION

References in the specification to "one embodiment" or "an embodiment" of the invention mean that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system to perform caching based at least on one or more file-level heuristics. In one embodiment of the invention, a cache policy engine performs caching of data from a persistent storage medium in a caching device. The cache policy engine receives file-level information of I/O access of data of the storage medium and caches or evicts the data of the storage medium in the caching device based at least on the received file-level information. By utilizing information about the files and file operations associated with the data of the storage medium, the cache policy engine is able to make a better decision on the data selected from the storage medium to be cached in or evicted from the caching device in one embodiment of the invention. Higher cache hit rates can be achieved and the performance of the system utilizing the cache policy engine is improved.

The storage medium may include, but is not limited to, a solid state drive, a hard-disk drive, a tape drive, a compact disk (CD), a floppy disk, an universal serial bus flash memory drive, or any other form of non-volatile computer data storage medium. The caching device includes, but is not limited to, a non-volatile media, a solid state drive, NAND flash memory, phase change memory or any other form of non-volatile computer data storage medium.

Figure 1:
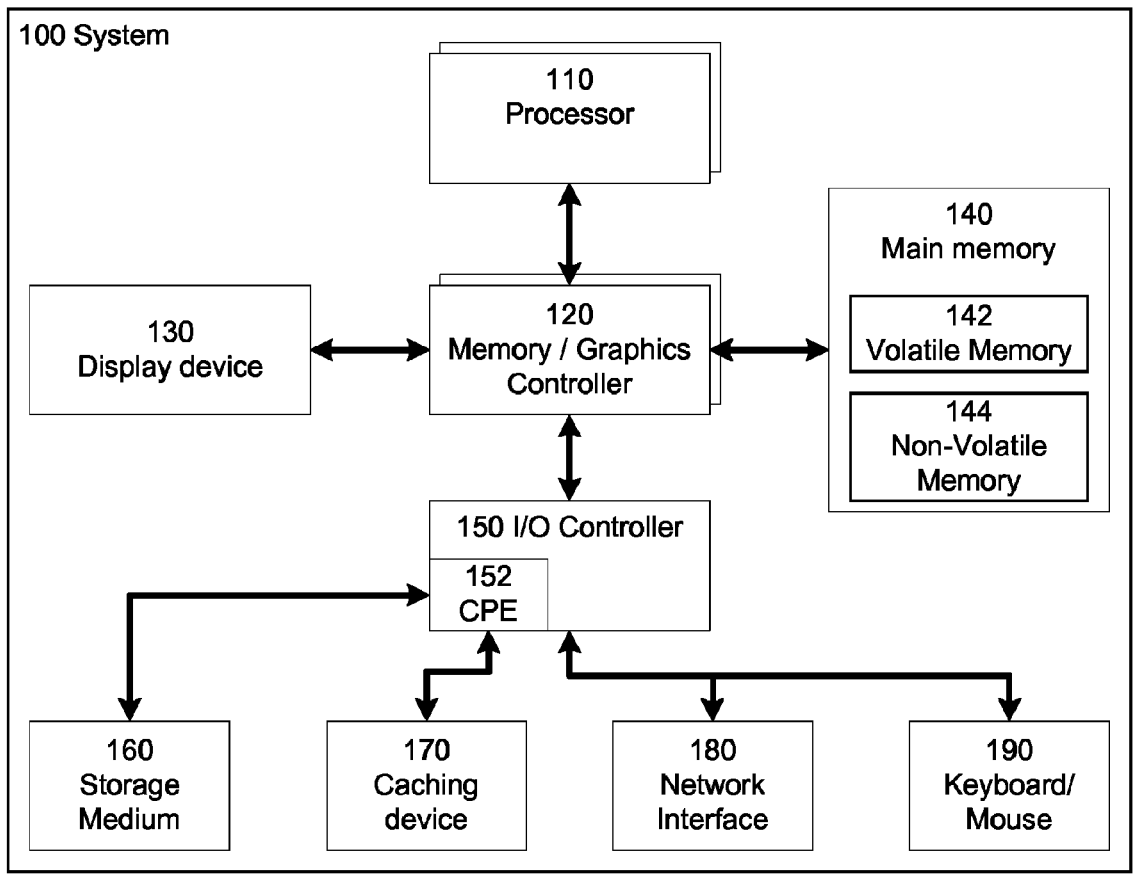
FIG. 1 illustrates a system to implement the methods disclosed herein in accordance with one embodiment of the invention.

FIG. 1 illustrates a system 100 to implement the methods disclosed herein in accordance with one embodiment of the invention. The system 100 includes but is not limited to, a desktop computer, a laptop computer, a notebook computer, a netbook computer, a personal digital assistant (PDA), a server, a workstation, a cellular telephone, a mobile computing device, an Internet appliance or any other type of computing device. In another embodiment, the system 100 used to implement the methods disclosed herein may be a system on a chip (SOC) system.

The system 100 includes a memory/graphics controller 120 and an I/O controller 150. The memory/graphics controller 120 typically provides memory and I/O management functions, as well as a plurality of general purpose and/or special purpose registers, timers, etc. that are accessible or used by the processor 110. The processor 110 may be implemented using one or more processors or implemented using multi-core processors. The I/O controller 150 has a cache policy engine 152 in accordance with one embodiment of the invention. The cache policy engine (CPE) 152 facilitates the access of I/O data between the I/O controller 150 and the storage medium 160 and caching device 170.

The memory/graphics controller 120 performs functions that enable the processor 110 to access and communicate with a main memory 140 that includes a volatile memory 142 and/or a non-volatile memory 144. In another embodiment of the invention, the cache policy engine 152 may be integrated in the memory/graphics controller 120 instead of the I/O controller 152. The volatile memory 142 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 144 includes, but is not limited to, NAND flash memory, ROM, EEPROM, and/or any other desired type of memory device. The main memory 140 stores information and instructions to be executed by the processor(s) 110. The main memory 140 may also store temporary variables or other intermediate information while the processor 110 is executing instructions. In another embodiment of the invention, the memory/graphics controller 120 is part of the processor 110.

The memory/graphics controller 120 is connected to a display device 130 that includes, but not limited to, liquid crystal displays (LCDs), cathode ray tube (CRT) displays, or any other form of visual display device. The I/O controller 150 is coupled with, but is not limited to, a storage medium (media) 160, a caching device(s) 170, a network interface 180, and a keyboard/mouse 190. In particular, the I/O controller 150 performs functions that enable the processor 110 to communicate with the storage medium 160, the caching device 170, the network interface 180, and the keyboard/mouse 190.

The network interface 180 is implemented using any type of well known network interface standard including, but is not limited to, an Ethernet interface, a universal serial bus (USB), a Peripheral Component Interconnect (PCI) Express interface, a wireless interface and/or any other suitable type of interface. The wireless interface operates in accordance with, but is not limited to, the Institute of Electrical and Electronics Engineers (IEEE) wireless standard family 802.11, Home Plug AV (HPAV), Ultra Wide Band (UWB), Bluetooth, WiMax, or any form of wireless communication protocol.

Figure 2:
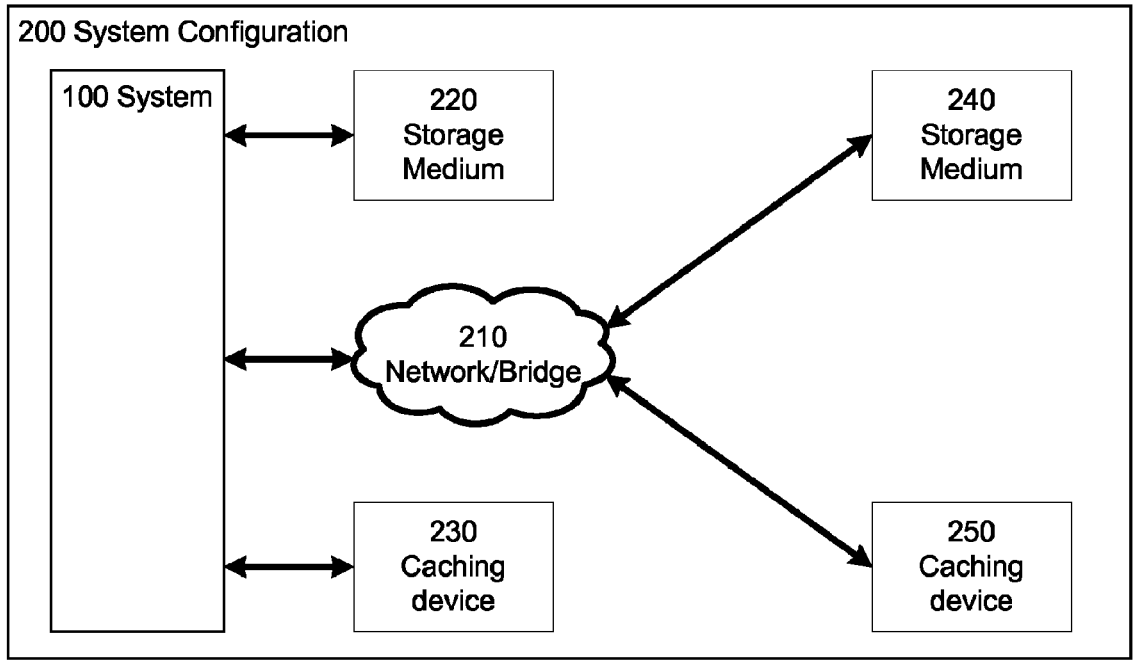
FIG. 2 illustrates a system configuration to implement the methods disclosed herein in accordance with one embodiment of the invention.

FIG. 2 illustrates a system configuration 200 to implement the methods disclosed herein in accordance with one embodiment of the invention. The system configuration 200 shows one embodiment of the invention where one or more caching devices and storage media can be connected with system 100. In system configuration 200, the storage medium 220 is connected to system 100 via a communication link. The communication link includes, but is not limited to, Advanced Technology Attachment (ATA) interface, Serial ATA (SATA) interface, and Serial-attached Small Computer System Interface (SCSI) (SAS) and any other wired or wireless communication link. Similarly, the caching device 230 is connected to the system 100 via a communication link including, but not limited to, SATA interface, SAS interface, PCI Express interface, and ONFI. In one embodiment of the invention, the communication link between the caching device 230 and the system 100 may be faster than the communication link between the storage medium 220 and the system 100.

The system 100 is also connected to storage medium 240 and caching device 250 via a network/bridge 210. The system configuration 200 shows that there are various ways of connecting the storage mediums 220 and 240 and the caching devices 230 and 250 to the system 100. The configuration of the caching device and the storage medium shown in FIGS. 1 and 2 are not meant to be limiting and one of ordinary skill in the relevant art will appreciate that other configurations can be used without affecting the workings of the invention. The caching device may be connected internally to the system 100 or externally to the system 100 via a communication link. For example, in one embodiment of the invention, the caching device 170 may be connected internally to the platform 100 to the CPE 152 via a communication link including, but not limited to, a PCI express interface, a SATA interface and ONFI. In another example, in one embodiment of the invention, the caching device 170 may be connected externally to the platform 100 via a USB communication link.

Figure 3:
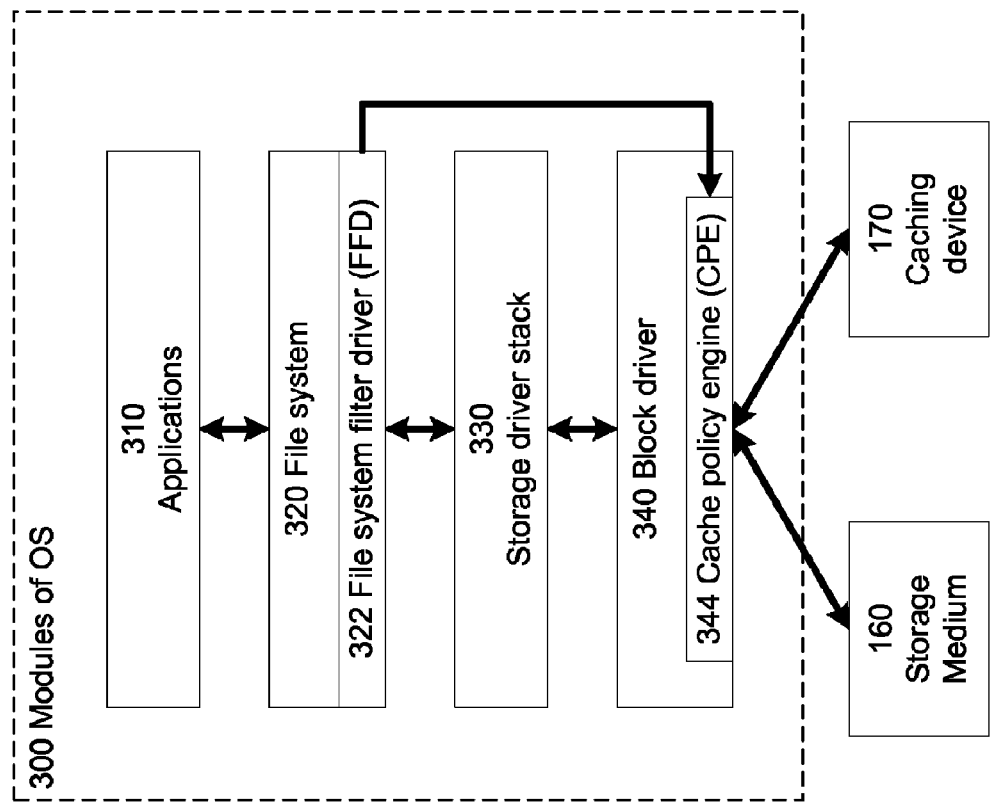
FIG. 3 illustrates a block diagram of the modules in an operating system in accordance with one embodiment of the invention.

FIG. 3 illustrates a block diagram 300 of the modules in an operating system (OS) in accordance with one embodiment of the invention. The OS has an applications layer 310 and a file system 320. The applications layer 310 is able to access files organized by the file system 320. The file system 320 has a file system filter driver (FFD) 322 to monitor the I/O access of data of the storage medium 160. The FFD 322 monitors file-level information including, but not limited to, LBA(s) of data accessed, file type of the accessed file(s), file name of the accessed file(s), file size of the accessed file(s), file operation(s) performed on the accessed file(s), file operation(s) performed on the accessed file(s), user or application intent driven from the attributes of the file create operation, and any other file-level information useable as caching heuristics.

The OS also has a storage driver stack 330 and a block driver 340. The block driver has a cache policy engine 344 that facilitates the access of storage medium 160 and caching device 170. The CPE 344 receives file-level information of I/O access of data of the storage medium 160 from the FFD 322 and caches or evicts data of the storage medium 160 in the caching device 170 based at least on one or more file-level heuristics. With knowledge of the file-level information, the CPE 344 can make better decisions regarding whether or not to cache or evict the data of the storage medium 160 from the caching device 170.

In one embodiment of the invention, the CPE 344 divides the caching device 170 into a number of cache lines. Each cache line stores one or more LBAs of the storage medium 160. In another embodiment of the invention, the data of the storage medium 160 is not arranged in LBA and an alternative addressing scheme may be used. Each cache line of the CPE 344 stores one or more units of the alternative addressing scheme. In yet another embodiment of the invention, the CPE 344 uses an insert or evict decision to determine whether to move a file to, or out of, the caching device 170. One of ordinary skill in the relevant art will readily appreciate that alternative addressing schemes besides the LBA scheme may be used by the CPE 344 to cache or evict data from the caching device 170 and the alternative addressing schemes can be used without affecting the workings of the invention.

The caching policy or file-level heuristic of the CPE 344 includes evicting the data of the storage medium 160 from the caching device 170 when a file associated with the data is deleted in one embodiment of the invention. For example, in one embodiment of the invention, if a file stored in the storage medium 160 is cached in one or more cache lines of the caching device 170, when the FFD 332 detects that the file is deleted by the OS, the FFD 332 informs the CPE 344 of the event. The CPE 344 makes a decision on whether to evict the data associated with the file from the caching device 170 based on the caching policy. The file deletion occurs in a scenario including, but not limited to, moving the file to a recycle bin of a Microsoft Windows® OS, deleting the file permanently, or any other events that cause a file to be temporarily or permanently deleted.

In one embodiment of the invention, the caching policy or file-level heuristic of the CPE 344 includes updating the LBA information of the cached data of the storage medium 160 in the caching device 170 when a file associated with the data is moved from a LBA location to another LBA location. For example, in one embodiment of the invention, each cache line of the caching device 170 contains the LBA information of the data that it caches. When a file is moved from one LBA location to another LBA location in the storage medium 160 by the OS during a defragmentation operation of the storage medium 160, the FFD 332 informs the CPE 344 to update the LBA information in the respective cache line(s) storing the data associated with the file in the caching device 170. In another example, the file may also be moved from one LBA location to another LBA location in the storage medium 160 by the OS when minor updates are performed on the file. The FFD 332 also informs the CPE 344 to update the LBA information in the respective cache line(s) storing the data associated with the file in the caching device 170. By updating the LBA information, it obviates the need to keep or evict invalid or stale LBA(s) of the storage medium 160 in the caching device 170. There is also no requirement to insert again the new LBA(s) in the caching device 170 when a file is moved from one LBA location to another LBA location in the storage medium 160.

In one embodiment of the invention, the caching policy or file-level heuristic of the CPE 344 includes updating the data pinning information of the cached data of the storage medium 160 when the metadata of a file associated with the data is updated after a movement of the file. For example, in one embodiment of the invention, one or more files can be specified directly or indirectly by a user or OS of the system to be placed in the caching device 170. The one or more files are termed as pinned files and when a movement of the pinned files by the OS results only in the updating of the metadata of the pinned files, the CPE 344 updates the data-pinning information to ensure that the data corresponding to the pinned files remains pinned in caching device 170. In addition, the CPE 344 may also update the LBA information in the respective cache line(s) storing the data associated with the pinned files in the caching device 170.

In one embodiment of the invention, the caching policy or file-level heuristic of the CPE 344 includes marking the cached data associated with a file in the caching device 170 to allow other files to reference or point to the cached data when the access information indicates that the file is copied. For example, in one embodiment of the invention, when a file is cached in the caching device 170, the CPE 344 marks the cached data associated with the file so that multiple files or LBAs can point or reference to the cached data. By doing so, the data I/O on all copies of the file can be accelerated without having to store the same data multiple times in the caching device 170. In one embodiment of the invention, the cached data can be marked by setting register bits associated with the cached data or any other method of indicating that the cached data can be referenced by multiple files or LBAs.

In one embodiment of the invention, the FFD 322 provides the sector map of a virtual memory page file of the OS to the CPE 344 to allow the cache insertion of the page file. In one embodiment of the invention, the caching policy or file-level heuristic of the CPE 344 includes caching the one or more LBAs that map the virtual memory page file of the OS. The FFD 322 can also send the process identification information of the data I/O access to the CPE 344. In one embodiment of the invention, the caching policy or file-level heuristic of the CPE 344 includes no caching of the data associated with a file when the process identification information indicates that the application initiating the data I/O access is a mining application. A mining application includes, but is not limited to, a virus scanning application, a data backup application, a data searching application, or any application that accesses data without reuse of the data. For example, in one embodiment of the invention, when a file is accessed by an OS, the FFD 320 can check if the file is accessed by a mining application. If so, the data associated with the file is not cached in the caching device 170.

In one embodiment of the invention, the caching policy or file-level heuristic of the CPE 344 includes evicting the data of the storage medium 160 when the file associated with the data is replaced by another file with an identical file name. For example, in one embodiment, when a file is copied to a destination directory that contains a file with the same name, the file in the destination directory is replaced and the data associated with the implicitly deleted file is evicted from the caching device 170. The data associated with the copied file is not inserted into the caching device 170.

In one embodiment of the invention, the caching policy or file-level heuristic of the CPE 344 includes evicting the data of the storage medium 160 from the caching device 170 when the file associated with the data is moved from a cached storage device to a non-cached storage device. For example, in one embodiment, the system 100 has two storage media and the caching device 170 caches only one of the storage media. The storage medium cached by the caching device 170 is termed as a cached storage device and the storage medium not cached by the caching device 170 is termed as a non-cached storage device. When a file stored in the cached storage device is cached in the caching device 170, the CPE 344 evicts the data associated with the file when the file is moved from the cached storage device to the non-cached storage device. In another example, in one embodiment of the invention, the caching device can also be used as a storage medium in addition to a caching device. When a file in the caching device 170 is moved from the caching device 170 to the storage medium 160, the CPE 344 evicts the data associated with the file.

In one embodiment of the invention, the caching policy or file-level heuristic of the CPE 344 includes de-prioritizing the data associated with a file when the file is copied from a cached storage device to a non-cached storage device. For example, in one embodiment, when a file stored in the cached storage device is cached in the caching device 170, the CPE 344 de-prioritizes the data associated with the file in the caching device 170 when the file is copied from the cached storage device to the non-cached storage device. In another example, in one embodiment, when a file stored in the cached storage device is not in the caching device 170, the CPE 344 does not insert or cache the data in the caching device 170 when the file is moved from the cached storage device to the non-cached storage device.

Figure 4:
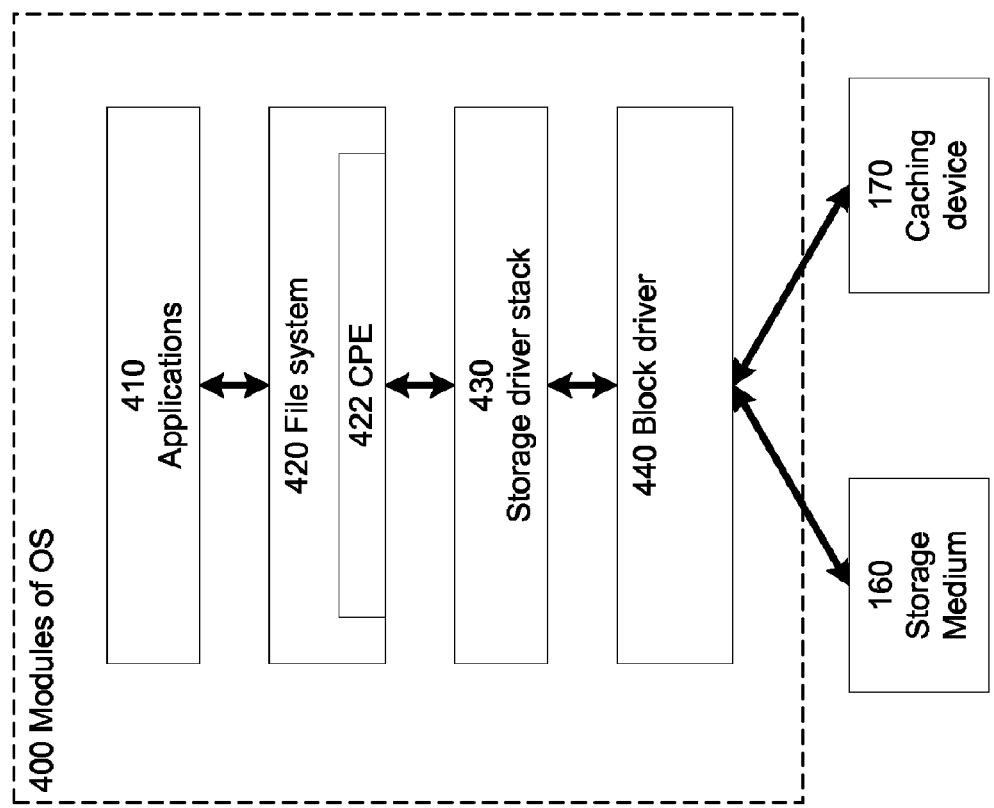
FIG. 4 illustrates a block diagram of the modules in an operating system (OS) in accordance with one embodiment of the invention.

FIG. 4 illustrates a block diagram 400 of the modules in an OS in accordance with one embodiment of the invention. The block diagram 400 shows that the CPE 422 can be part of the file system 420. For example, in one embodiment of the invention, the CPE is a part of the FFD and the CPE 422 is able to obtain the file-level information of I/O access of data of the storage medium 160 and to cache or evict data of the storage medium 160 in the caching device 170 based at least on one or more file-level heuristics.

In one embodiment of the invention, the caching policy or file-level heuristic of the CPE 422 includes caching the data associated with a file when the file is opened for read access. For example, in one embodiment of the invention, when a file with only read access permission is opened, the data associated with the file is pre-fetched from the storage medium 160 and cached in the caching device 170 if there is available storage space in the caching device 170. In another embodiment of the invention, the pre-fetched data can be marked to indicate that the pre-fetched data is not accessed recently.

In one embodiment of the invention, the caching policy or file-level heuristic of the CPE 422 includes evicting the data associated with a file when the file is opened for overwriting. In another embodiment of the invention, the caching policy or file-level heuristic of the CPE 422 includes evicting the data associated with a file when the file is opened for read access and a fast I/O flag of the file is set. For example, in one embodiment of the invention, an OS may set a fast I/O flag for data that is cached in a system cache and the data is transferred directly between user buffers and the system cache, bypassing the file system 420 and the storage driver stack 430. The CPE 422 evicts the data associated with a file when the file is opened for read access by an OS executing on the system and a fast I/O flag of the file is set. When the fast I/O flag of a file is set, the data associated with the file is cached by the OS in the system cache and the access rate of the file is increased. Therefore, in one embodiment of the invention, the CPE 422 does not cache the data associated with the file as the access rate of the file is already increased.

The OS can perform a fast I/O read operation in conjunction with a read ahead operation. For example, when the OS is performing a fast I/O read operation, the OS checks if it needs to perform a read ahead operation. If a read ahead operation is required, the OS issues the read ahead command during the fast I/O read operation. In one embodiment of the invention, the caching policy or file-level heuristic of the CPE 422 includes caching the data associated with the read ahead command when the OS issues the read ahead command during a fast I/O read operation. By caching the data associated with the read ahead command, it allows the fast I/O operation be improved further.

In one embodiment of the invention, the caching policy or file-level heuristic of the CPE 422 includes evicting the data associated with a file when the file is closed. In another embodiment of the invention, the data associated with a file can be de-prioritized to be kept in the caching device 170 as the data is unlikely to be used again without an intermediate file operation to open the file. In one embodiment of the invention, the caching policy or file-level heuristic of the CPE 422 includes no caching of the data associated with a file if the file is a media streaming file. For example, in one embodiment of the invention, when the OS is performing sequential read operations on a media streaming file, the CPE 422 does not cache the media streaming file in the caching device 170. A media streaming file is a file operating in a format including, but not limited to, an audio video interleave (AVI) format, Moving Picture Experts Group (MPEG) 1 Audio Layer 3 (MP3) format, MP4 format, QuickTime format and any other media streaming format.

In one embodiment of the invention, the caching policy or file-level heuristic of the CPE 422 includes evicting the data associated with a file when the size of the file is larger than a threshold. For example, in one embodiment of the invention, when CPE 422 receives the information about the size of a file, it decides to cache the data associated with the file in the caching device 170 based on a threshold. In one embodiment, the CPE 422 sets the threshold to a small or moderate value so that large files may be left in the storage medium 160 and more small files are allowed to remain in the caching device 170. This operation may be done in the background, or on file read access operations.

The OS can mark the data associated with a file according to a priority scheme. In one embodiment of the invention, the caching policy or file-level heuristic of the CPE 422 includes no caching of the data associated with a file when the file is marked as low priority. In other embodiments, if the file marked as low priority is already cached in the caching device 170, the CPE 422 lowers the priority of the data associated with the file. In one embodiment of the invention, the caching policy or file-level heuristic of the CPE 422 includes caching the data associated with a file when the file is to be accessed by an application marked as high priority. For example, in one embodiment of the invention, when an application is marked as high priority, the CPE 422 checks if the process identification of any application to be executed matches the application. If there is a match, the data to be accessed by the application is cached in the caching device 170.

The information about the file type or file extension of an accessed file can be used by the CPE 422 to define an inclusion and exclusion list. The inclusion list includes files of one or more files types or extensions to be included in the caching device 170 and the exclusion list includes files of one or more file types or extensions to be excluded in the caching device 170. In one embodiment of the invention, the caching policy or file-level heuristic of the CPE 422 includes caching the data associated with a file when the file type or file extension of the file belongs to an inclusion list and to avoid caching or evicting the data associated with the file when the file type or file extension of the file belongs to an exclusion list. For example, in one embodiment, the inclusion list can include all files with a file extension of "doc". In addition, additional rules can be added in conjunction with the inclusion or exclusion list in another embodiment of the invention. For example, a rule can specify that files of a file type that is executable are to be included in the inclusion list and the file size should not be more than 256 kilobytes.

The caching policies or file-level heuristics described herein can be performed by the FFD 322, by the CPE 344 and 422, or by another component in the system. Although the CPE is shown as part of the I/O controller in FIG. 1, as block driver 340 in FIG. 3 and as part of the file system 420 in FIG. 4, it is not meant to be limiting. The cache policy engine may be part of another component of the system, or part of an application, or another filter driver, or may be included as part of the hardware/firmware on the system. The caching policies or file-level heuristics described herein are not meant to be limiting and one of ordinary skill in the relevant art will readily appreciate that other file-level heuristics can also be used without affecting the workings of the invention. In other embodiments of the invention, the CPE can use other heuristics in conjunction with the file-level heuristics to make better decisions on the data selection of the storage medium to be cached in or evicted from the caching device. The other heuristics include, but are not limited to, least recently touched data, first data inserted, and last data inserted.

FIG. 5 illustrates a table 500 that maps the LBAs to file-level information in accordance with one embodiment of the invention. In one embodiment of the invention, the FFD 322 receives file-level information for each I/O data access. Table 500 shows a mapping of the LBA 510 with the filename 520, file size 530, file type 540, and file operation 550. In one embodiment of the invention, the CPE 344 uses table 500 to determine the appropriate caching policy action to be performed The FFD 322 maintains the table 500 and the CPE 344 queries or extract file-level information from the table 500 for its caching operations based on one or more items of the file-level information.

In yet another embodiment of the invention, the CPE 422 maintains the table 500 without the aid of a FFD 322, i.e., the CPE is a part of the FFD 322. For example, the caching policy of CPE 422 determines that the file music.mp3 is a media streaming file and therefore the file music.mp3 is not cached in the caching device 170 according to one of the file-level heuristic in one embodiment of the invention. The table 500 can be maintained in main memory 140 of the platform, in the caching device 170, or any other location where the CPE is able to access. The file-level information shown in table 500 is not meant to be limiting and the table 500 can maintain less or more file-level information that allows the CPE to make better decisions.

Figure 6:
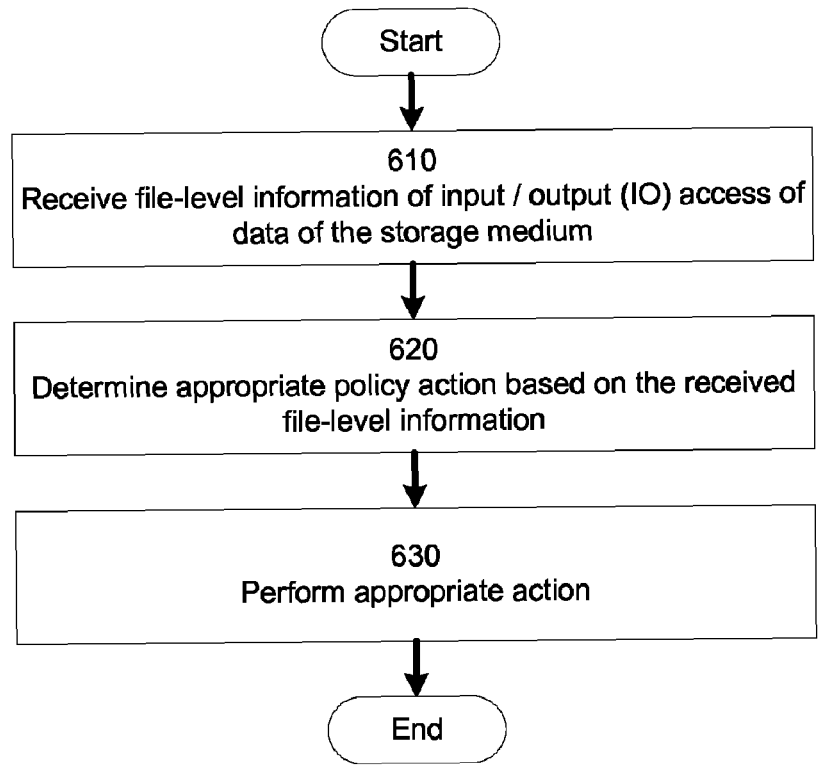
FIG. 6 illustrates a flow chart of the steps to perform caching policy in accordance with one embodiment of the invention

FIG. 6 illustrates a flow chart 600 of the steps to perform caching policy in accordance with one embodiment of the invention. In step 610, file-level information of I/O access of data of the storage medium 160 is received. In step 620, the appropriate caching policy action is determined based on the received file-level information. In step 630, the appropriate action is performed. The cache policy heuristics described herein are not meant to be limiting and one of ordinary skill in the relevant art may apply other caching policy heuristics based at least on the file-level information without affecting the workings of the invention.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems, and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:
receiving file-level information of input/output (I/O) access of data stored in a storage medium, wherein the file-level information comprises at least one of file deletion, file copying, file opening, file reading, file size, file type, and file movement information; and
caching or evicting the data stored in the storage medium into a caching device based at least on the received file-level information.

2. The method of claim 1, wherein caching or evicting the data stored in the storage medium into the caching device comprises caching or evicting data stored in one or more logical block addresses (LBAs) of the storage medium into the caching device.

3. The method of claim 2, wherein the one or more LBAs of the storage medium are mapped to a virtual memory page file and wherein caching or evicting the data stored in the storage medium into the caching device comprises caching the one or more LBAs mapped to the virtual memory page file into the caching device.

4. The method of claim 1, wherein caching or evicting the data stored in the storage medium into the caching device comprises caching the data when a file type or a file extension of the data belongs to an inclusion list and no caching of the data, or evicting the data when the file type of the data belongs to an exclusion list.

5. The method of claim 1, wherein the file-level information comprises access priority of the data by an operating system (OS), and wherein caching or evicting the data stored in the storage medium into the caching device comprises no caching of the data, or evicting the data when the access priority of the data is low and caching of the data when the access priority of the data is high.

6. The method of claim 1, wherein the file-level information comprises information of an application performing the IO access of the data and wherein caching or evicting the data stored in the storage medium into the caching device comprises no caching of the data when the application is a mining application.

7. A method comprising:
receiving file-level information of input/output (I/O) access of data stored in a storage medium; and
caching or evicting the data stored in the storage medium into a caching device based at least on the received file-level information, wherein caching or evicting the data stored in the storage medium into the caching device comprises caching the data when a file type or a file extension of the data belongs to an inclusion list and no caching of the data, or evicting the data when the file type of the data belongs to an exclusion list.

8. The method of claim 7, wherein caching or evicting the data stored in the storage medium into the caching device comprises caching or evicting data stored in one or more logical block addresses (LBAs) of the storage medium into the caching device.

9. The method driver of claim 7, wherein the file-level information comprises at least one of file deletion, file copying, file opening, file reading, file size, file type, and file movement information.

10. The method of claim 7, wherein the file-level information comprises access priority of the data by an operating system (OS), and wherein caching or evicting the data stored in the storage medium into the caching device comprises no caching of the data, or evicting the data when the access priority of the data is low and caching of the data when the access priority of the data is high.

11. The method of claim 7, wherein the file-level information comprises information of an application performing the IO access of the data and wherein caching or evicting the data stored in the storage medium into the caching device comprises no caching of the data when the application is a mining application.

12. The method of claim 11, wherein the one or more LBAs of the storage medium are mapped to a virtual memory page file and wherein caching or evicting the data stored in the storage medium into the caching device comprises caching the one or more LBAs mapped to the virtual memory page file into the caching device.

13. A system comprising:
a storage medium to store data;
a NAND flash memory to cache the data of the storage medium; and
a cache policy engine to cache or evict the data of the storage medium in the NAND flash memory based at least on one or more file-level heuristics associated with the data, wherein the one or more file-level heuristics comprises no caching, evicting, reducing a priority, or increasing an age of the data when a size of a file associated with the data is larger than a threshold.

14. The system of claim 13, wherein the NAND flash memory has a faster access rate than the storage medium.

15. The system of claim 13, wherein the cache policy engine is part of a block driver, and wherein the block driver is to facilitate access of the NAND flash memory and the storage medium by the system.

16. The system of claim 13, wherein the one or more file-level heuristics comprises evicting the data when a file associated with the data is deleted by an operating system (OS) executing on the system.

17. The system of claim 13, wherein the cache policy engine is further to update logical block address (LBA) information of cached data of the storage medium when a file associated with the data is moved from a LBA location to another LBA location by an operating system (OS) executing on the system without writing the data again to the storage medium.

18. The system of claim 13, wherein the one or more file-level heuristics comprises caching at least a portion of the data when a file associated with the data is opened by an operating system (OS) executing on the system.

19. The system of claim 13, wherein the one or more file-level heuristics comprises no caching of the data when a file associated with the data is a media streaming file.

20. An apparatus comprising:
a cache policy engine to cache or evict data stored in a storage medium into NAND flash memory based at least on one or more file-level heuristics associated with the data, wherein the file-level heuristics comprise at least one of file deletion, file copying, file opening, file reading, file size, file type, and file movement information.

21. The apparatus of claim 20, wherein the cache policy engine is part of a file system filter driver, and wherein the cache policy engine is to facilitate access of the NAND flash memory and the storage medium by the system.

22. The apparatus of claim 20, wherein the one or more file-level heuristics comprises access information of the data and wherein the cache policy engine to cache or evict the data stored in the storage medium into the NAND flash memory is to evict the data when the access information indicates that a file associated with the data is closed.

23. The apparatus of claim 20, wherein the one or more file-level heuristics comprises access information of the data and wherein the cache policy engine to cache or evict the data stored in the storage medium into the NAND flash memory is to evict the data when the access information indicates that a file associated with the data is opened for a read operation and a fast I/O flag of the file is set.

24. The apparatus of claim 20, wherein the one or more file-level heuristics comprises access information of the data and wherein the cache policy engine to cache or evict the data stored in the storage medium into the NAND flash memory is to cache data associated with a read ahead command when the access information indicates that the read ahead command is issued during a fast I/O read operation of the data.

25. The apparatus of claim 20, wherein the one or more file-level heuristics comprises access information of the data, and wherein the cache policy engine is further to mark a cached data of a file to allow reference of the cached data by other files when the access information indicates that the file is copied.

26. The apparatus of claim 20, wherein the one or more file-level heuristics comprises access information of the data, and wherein the cache policy engine to cache or evict the data stored in the storage medium into the caching device is to evict the data when the access information indicates that a file associated with the data is replaced by another file with an identical file name.

27. The apparatus of claim 20, wherein the one or more file-level heuristics comprises access information of the data, and wherein the cache policy engine to cache or evict the data stored in the storage medium into the caching device is to evict the data when the access information indicates that the file associated with the data is moved from a cached storage device to a non-cached storage device.

28. The apparatus of claim 20, wherein the one or more file-level heuristics comprises access information of the data, and wherein the cache policy engine is further to de-prioritize the data associated with a file in the caching device when the access information indicates that the file associated with the data is copied from a cached storage device to a non-cached storage device.

29. The apparatus of claim 20, wherein the one or more file-level heuristics comprises access information of the data, and wherein the cache policy engine to cache or evict the data stored in the storage medium into the NAND flash memory is to cache the data associated with a file when the access information indicates that an application to access the file is marked as high priority.

30. A computer readable storage medium having instructions stored thereon which, when executed, cause a processor to perform the following method:
receiving file-level information of input/output (I/O) access of data stored in a storage medium, wherein the file-level information comprises at least one of file deletion, file copying, file opening, file reading, file size, file type, and file movement information; and
caching or evicting the data stored in the storage medium into a caching device based at least on the received file-level information.

31. The medium of claim 30, wherein the processor to cache or evict the data stored in the storage medium into the caching device is to cache or evict data stored in one or more logical block addresses (LBAs) of the storage medium into the caching device.

32. The medium of claim 31, wherein the processor is further to update LBA information of cached data of the storage medium when a file associated with the data is moved by an operating system (OS) executing on the processor.

33. The medium of claim 31, wherein the processor is further to update LBA information of cached data of the storage medium when a file associated with the data is moved from a LBA to another LBA by an operating system (OS) executing on the processor.

34. The medium of claim 30, wherein the file-level information comprises at least one of file deletion, file copying, file opening, file reading, file size, file type, and file movement, information.

35. The medium of claim 30, wherein the file-level information comprises access information of the data and wherein the processor to cache or evict the data stored in the storage medium into the caching device is to:
pre-fetch the data stored in the storage medium; and
cache the data stored in the storage medium into the caching device when the access information indicates that a file associated with the data is opened for a read operation.

36. The medium of claim 30, wherein the file-level information comprises access information of the data and wherein the processor to cache or evict the data stored in the storage medium into the caching device is to evict the data when the access information indicates that a file associated with the data is opened for an overwrite operation.

* * * * *